United States Patent
Mani

[11] 3,937,590
[45] Feb. 10, 1976

[54] ACOUSTIC DUCT WITH PERIPHERALLY SEGMENTED ACOUSTIC TREATMENT

[75] Inventor: Ramani Mani, Scotia, N.Y.

[73] Assignee: General Electric Company, Schenectady, N.Y.

[22] Filed: Sept. 3, 1974

[21] Appl. No.: 503,031

[52] U.S. Cl............ 415/119; 137/15.1; 181/33 HA; 181/42
[51] Int. Cl.² .......................................... F04D 29/66
[58] Field of Search ........ 181/33 H, 33 HA, 33 HB, 181/42, 50, 33 P, 33 E; 415/119; 137/15.1

[56] References Cited
UNITED STATES PATENTS

| | | | |
|---|---|---|---|
| 3,263,771 | 8/1966 | Seifert.................................. | 181/42 |
| 3,508,838 | 4/1970 | Martenson.............. | 181/33 HA UX |
| 3,620,329 | 11/1971 | Wenzlaff...................... | 181/33 HB |
| 3,819,008 | 6/1974 | Evans et al. ................... | 181/33 H X |
| 3,830,335 | 8/1974 | Zorumski....................... | 181/33 H X |
| 3,848,697 | 11/1974 | Jannot et al................... | 181/33 HB |

Primary Examiner—John F. Gonzales
Attorney, Agent, or Firm—Donald R. Campbell; Joseph T. Cohen; Jerome C. Squillaro

[57] ABSTRACT

An acoustic duct such as a jet engine fan duct is lined with numerous peripherally spaced, longitudinally extending strips of sound-absorbing material which are effective to scatter spinning mode acoustic pressure fields to higher order, attenuating modes for improved noise suppression. These strips can be alternated with other strips having a different acoustical impedance, or combined with a longitudinally segmented treatment.

9 Claims, 13 Drawing Figures

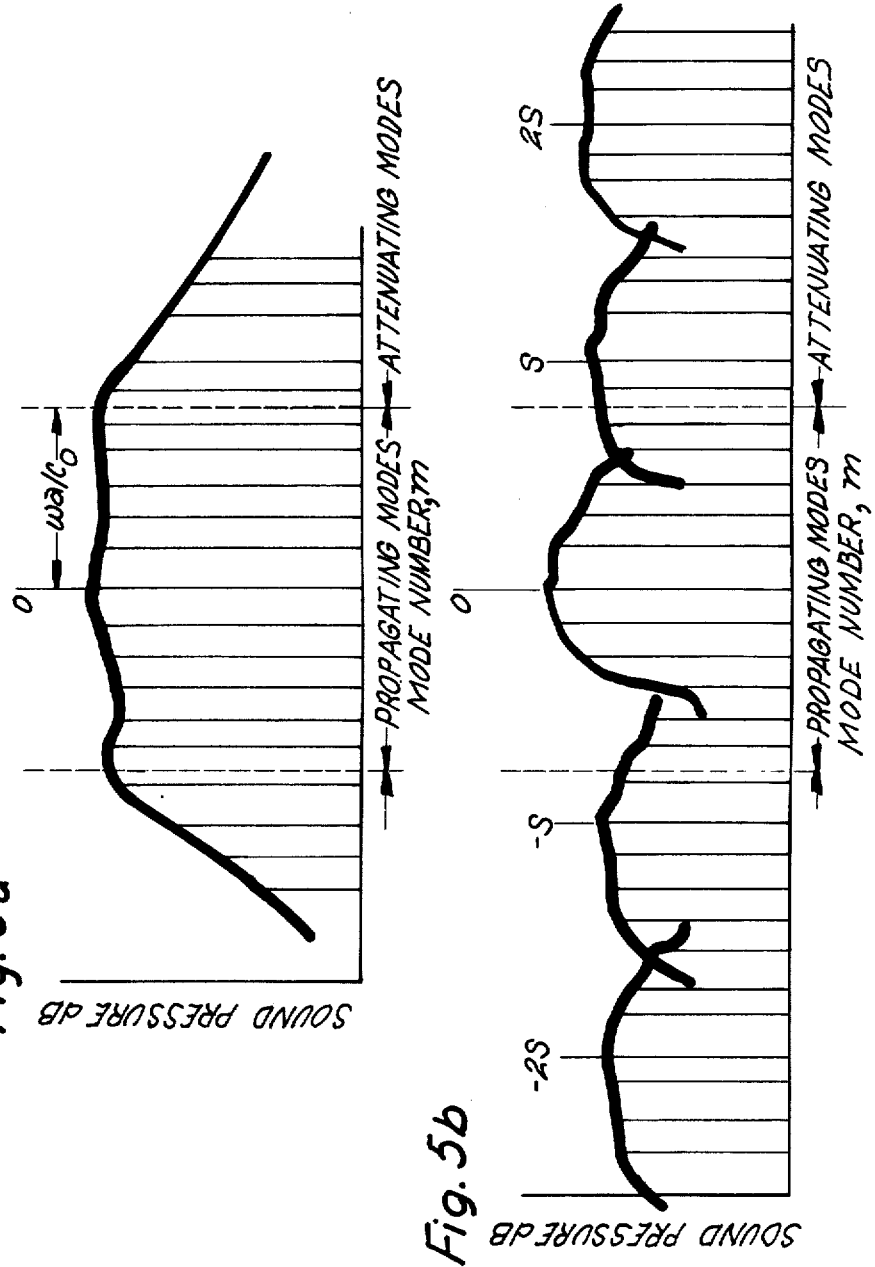

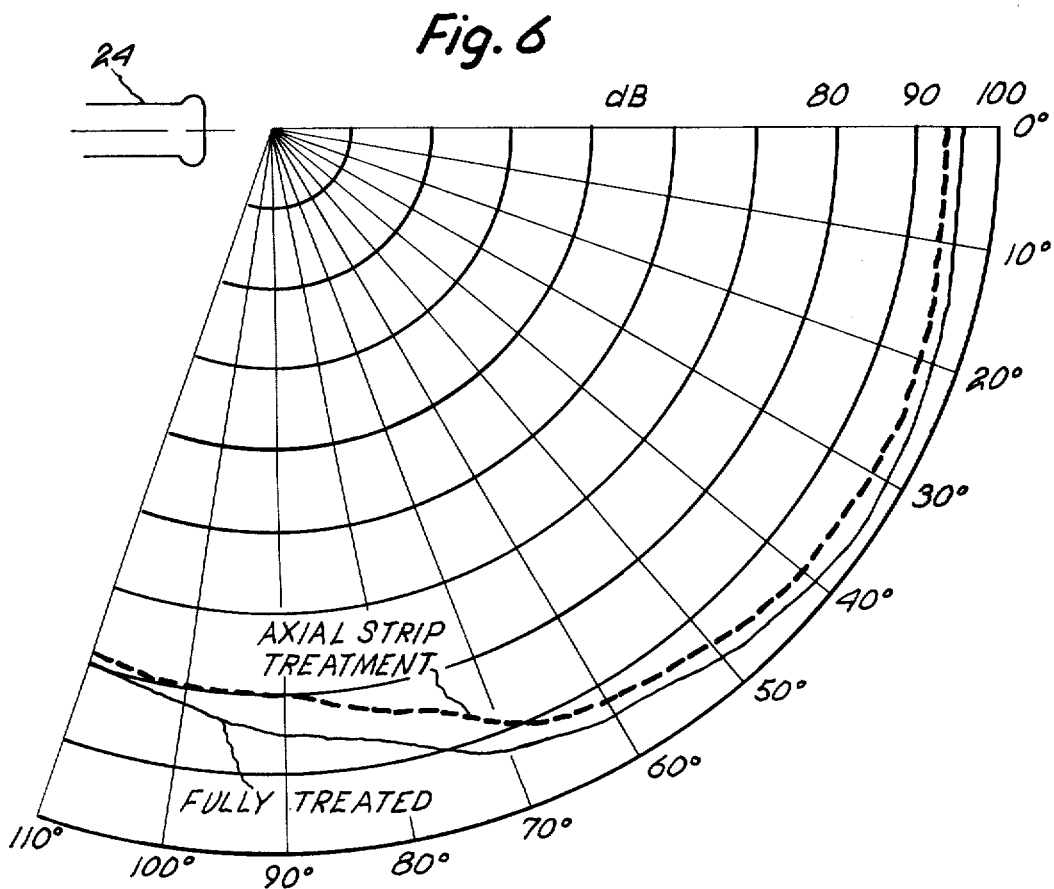

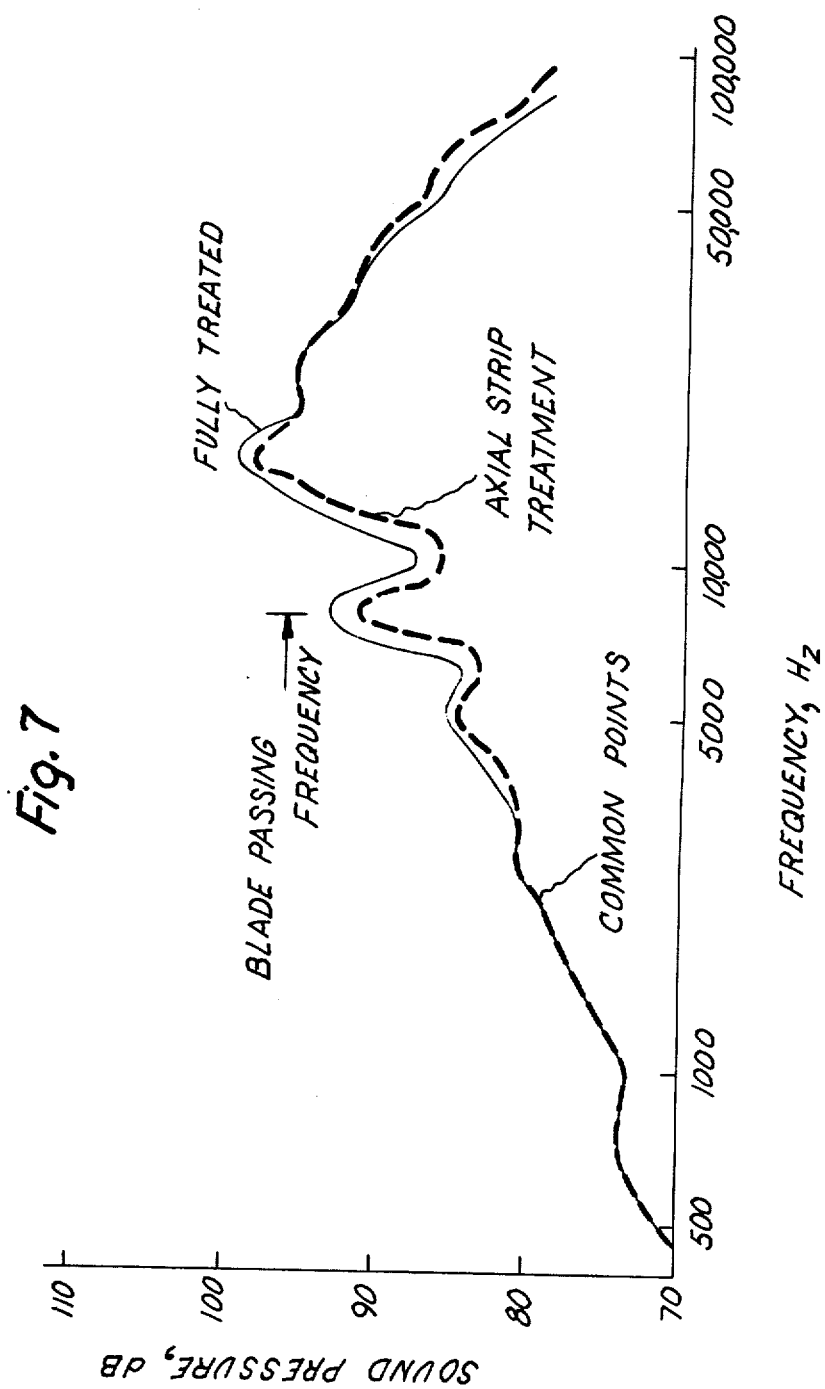

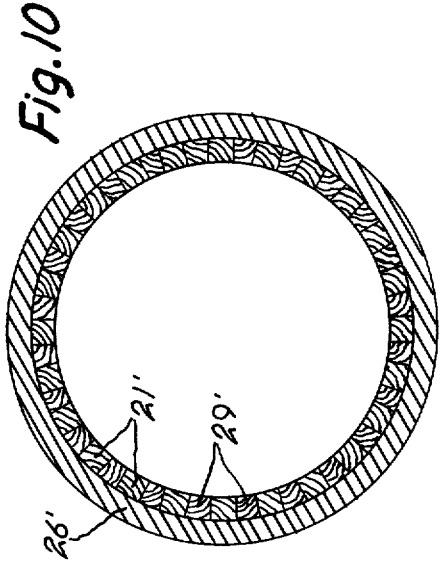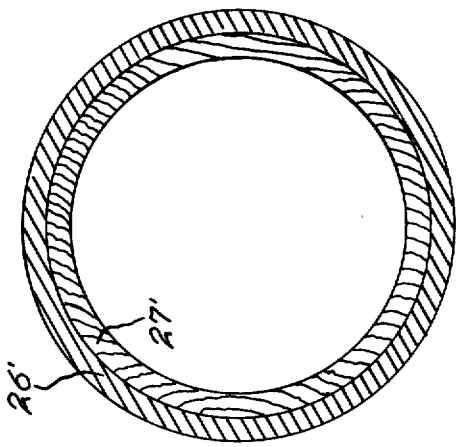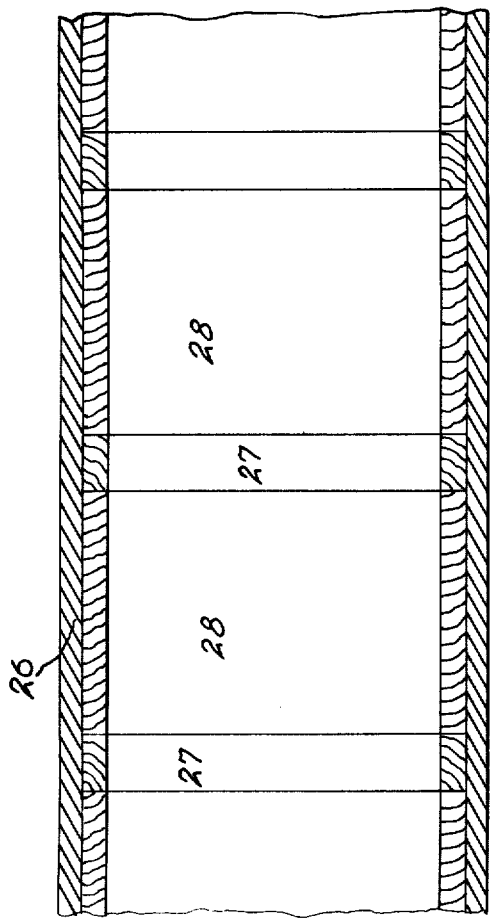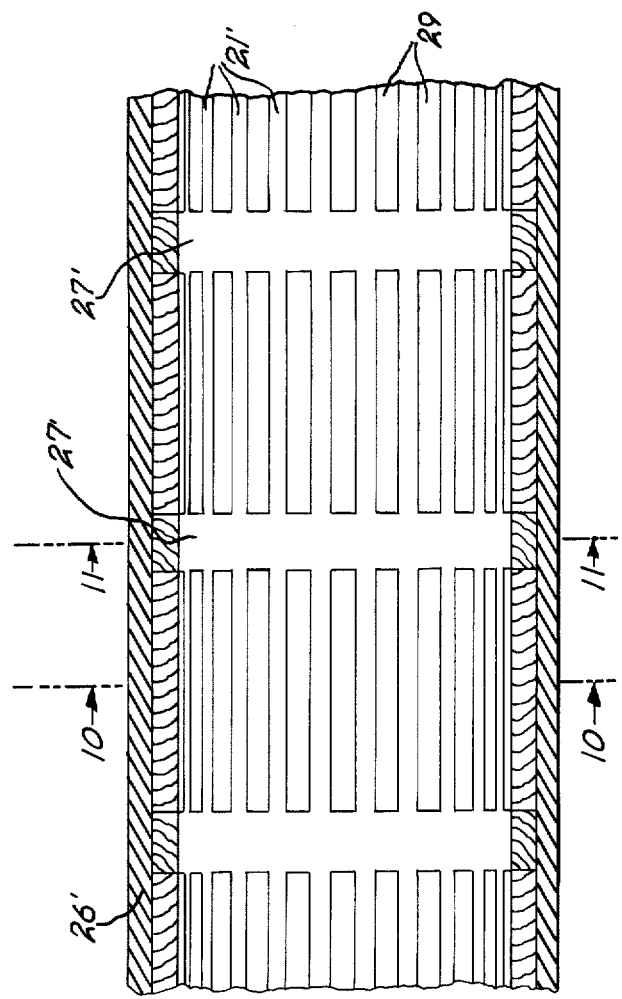

3,937,590

1

ACOUSTIC DUCT WITH PERIPHERALLY SEGMENTED ACOUSTIC TREATMENT

BACKGROUND OF THE INVENTION

This invention relates to sound-absorbing acoustic ducts, and more particularly to acoustic ducts with peripherally semented or peripherally and longitudinally segmented treatments for absorbing spinning mode acoustical energy. As a typical application, the invention relates to noise suppressing linings for the inlet of an aircraft jet engine fan.

The sound pressure field generated by an axial flow compressor, commonly referred to as a fan, contains rotating pressure patterns or spinning modes caused primarily by interaction of the rotor and stator. Depending on the rotational speed of the rotating pressure patterns, these spinning modes can be divided into attenuating modes and propagating modes, and it is the propagating modes that are transmitted through the acoustically lined duct and radiate objectionable noise to the outside. Although sound suppressing treatments are often used, usually extending over the entire inner surface of the fan duct, such treatments are employed generally and are not tailored for absorption of spinning mode sound. Non-uniform circumferential acoustical treatment is disclosed in several patent applications and patents assigned to the same assignee, but is provided for a much different reason. By way of example, these include application Ser. No. 442,893 filed on Feb. 15, 1974 by Norman J. Lipstein, entitled "Acoustic Duct with Asymmetrical Acoustical Treatment" now U.S. Pat. No. 3,890,060; and U.S. Pat. No. 3,508,838 granted on Apr. 28, 1970 to A. J. Martenson. The present invention is directed to an improved acoustic duct for the more effective suppression of sounds generated by a jet engine fan or other source of spinning mode pressure fields.

SUMMARY OF THE INVENTION

It has been found that a peripherally or circumferentially segmented acoustical treatment is effective to enhance scattering of spinning mode acoustic pressure fields to increase the higher order, attenuating type mode content for improved sound suppression in an acoustic duct of any cross section. As is known the duct has a cut-off property depending upon the tip speed of the rotating pressure patterns. Higher order mode number or lobe number pressure patterns have a tip speed less than the speed of sound and are attenuated, while lower order mode number pressure patterns have a tip speed greater than the speed of sound and are propagated. Assuming a cylindrical duct, the effect of attaching a set of circumferentially spaced, axially extending strips of sound-absorbing material to the inner duct surface is to alter the modal distribution and provide an additional periodicity to which the sound field must conform. The acoustical energy is scattered to increase the ratio of higher order, attenuating modes. The number of equally spaced strips in the set is usually large, in any event several or more, and for the case where the noise source is a compressor with rotor and stator blades, the number of strips exceeds or is a multiple of the number of first stage rotor blades.

In the preferred embodiment, a second set of circumferentially spaced, axially extending strips of a sound-absorbing material having a different acoustical impedance are located between and alternate with the first set of strips to form a continuous acoustic lining. In another embodiment, the axial strip treatment is combined with a circumferential or peripheral strip treatment in a checkerboard type pattern. With an axial spacing less than one wavelength at a given frequency, the sound field is "filtered". Four-sided lining members of a material with a different acoustic impedance as compared to the intersecting axial and circumferential strips can be attached in the spaces between. Numerous applications are possible, such as the suppression of aircraft engine noise, and appliance and machinery noise.

BRIEF DESCRIPTION OF THE DRAWINGS

FIG. 5a is a plot of sound pressure level vs. mode number showing the modal distribution of sound pressure for a uniformly, fully treated fan duct;

FIG. 5b is similar to FIG. 5a and shows the altered modal distribution of sound pressure obtained by the interrupted treatments of FIG. 2 and FIG. 3 for improved sound suppression;

FIG. 6 shows a typical experimentally obtained directivity pattern at a particular frequency, for the arc with respect to the inlet axis of 0° to 100°, for noise radiating from a cylindrical fan duct for the two cases when the duct is fully treated and has axial strip treatment as illustrated in FIGS. 1 and 2;

FIG. 7 shows, for the experimental arrangement of FIG. 6 at a particular angle with respect to the inlet axis, the sound pressure levels over a range of sonic frequencies for a fully treated duct and a duct with axial strip treatment as in FIGS. 1 and 2;

FIG. 8 is a longitudinal cross section through an acoustic duct with axially segmented treatment using alternating strips of two different acoustic materials;

FIG. 9 is a longitudinal cross section through a cylindrical acoustical duct according to another embodiment of the invention with both circumferentially and axially segmented treatments in a "checkerboard" pattern using two different acoustic materials; and FIGS. 10 and 11 are vertical cross sections taken at lines 10—10 and 11—11, respectively, of FIG. 9.

DESCRIPTION OF THE PREFERRED EMBODIMENTS

Figure 1:
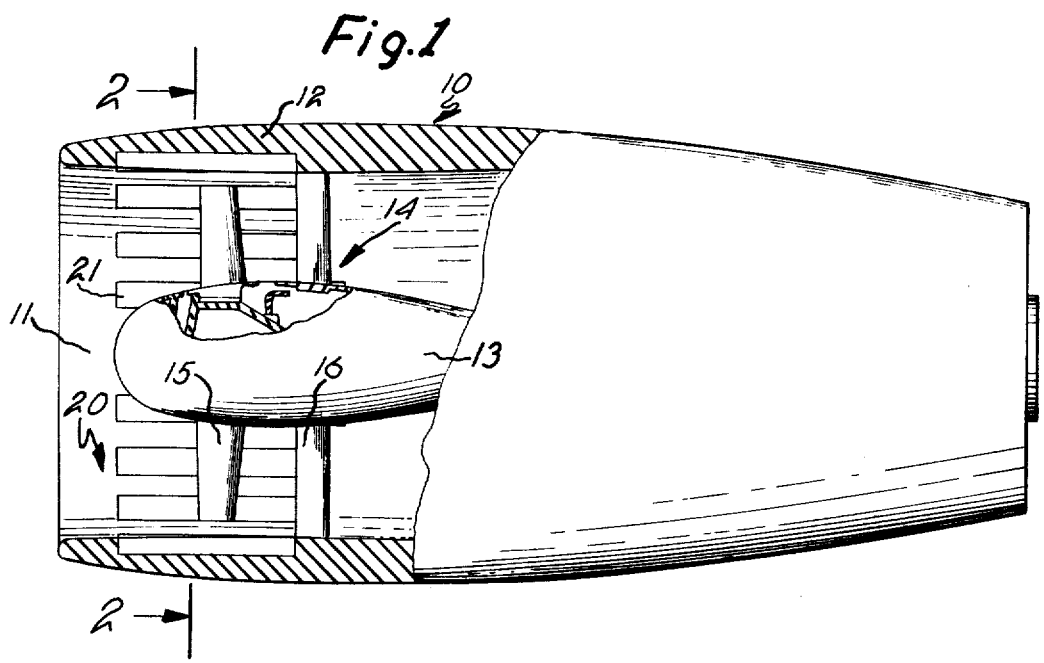
FIG. 1 is a diagrammatic side elevational view, partially in longitudinal cross section, of the forward portion of a ducted fan type aircraft jet engine having a fan duct provided with circumferentially segmented acoustical treatment according to the teaching of the invention.

The invention has general utility to acoustic ducts used for the suppression of noise and sound produced by compressors, fans, and other rotating mechanical equipment which generates acoustic pressure fields characterized by spinning mode patterns. The application discussed in detail is a more effective acoustic treatment or noise suppressing lining for the inlet duct of an aircraft jet engine fan to reduce the noise level heard at the ground especially during take-off and landing. In FIG. 1 there is shown generally at 10 the forward portion of ducted fan type turbojet engine having an annular streamlined fan duct air passage 11 formed between an annular cowling or fan casing 12 of streamlined cross section and a suitable engine nacelle structure 13 projecting within the cowling 12. The nacelle 13 houses a suitable compressor, combustor, and turbomachinery for, as part of its functions, driving an axial flow compressor 14 disposed in the air passage 11 between the forward end of the cowling 12 and the nacelle 13. The fan 14 is illustrated as being comprised by a single rotor member 15 and stator member 16, but additional stages can be provided as is known in the art. The fan drives inlet air axially through the primary air passage 11 to provide propulsive thrust to the engine as well as to supply air to the compressor.

Figure 2:
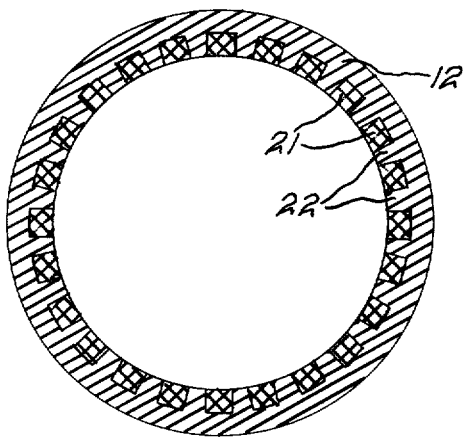
FIG. 2 is a vertical cross section of only the inlet fan duct taken on the line 2—2 of FIG. 1.

Referring also to FIG. 2, the inside surface of the cowling 12 at least in the inlet duct area in accordance with the invention is lined with a peripherally or circumferentially segmented acoustical treatment indicated generally at 20. This structure is hereafter referred to as the noise suppressing fan duct. In its simplest form, the acoustical treatment as herein taught takes the form of peripherally or circumferentially spaced strips 21 of a suitable sound-absorbing material, these strips being relatively thin and extending in the longitudinal or axial direction. Preferably, a large number of the circumferentially spaced, axially extending strips 21 are provided, recessed into the duct wall so as to be flush with the smooth metal lining 22 between the strips. For rotors wherein the rotor blade tip speed is sonic, the number of strips is desirably two or three times the number of rotor blades, while for rotors with a subsonic tip speed the number of strips is suitably about one and one-half times the number of rotor blades. Although the axial strip acoustical treatment can extend over the full length of the fan duct, it is illustrated in FIG. 1 as applied only to the inlet duct where more effective noise suppression is most needed.

Figure 3:
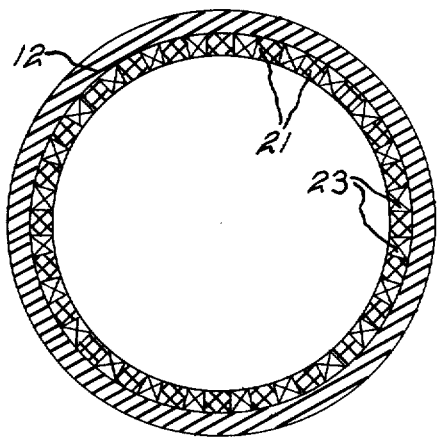
FIG. 3 is similar to FIG. 2 and shows the preferred embodiment using alternating axially extending strips of two different acoustic materials.

The preferred embodiment of the invention shown in FIG. 3 utilizes a second set of longitudinally or axially extending sound absorbing strips 23 that are located between and alternate with the strips 21. The acoustical materials of which the two sets of strips 21 and 23 are made have different acoustical properties or acoustical impedances at the frequency or range of frequencies of interest. Preferably, the strips 21 and 23 have the same width, but this is not essential. In the general case, a wide variety of acoustic materials can be used, but for the specific application of an aircraft engine fan jet the material should be easily cleaned and provide for drainage of ingested liquids, such as a single degree of freedom treatment or the honeycombed, resonant chamber sound absorbing panels described in U.S. Pat. No. 3,542,152, assigned to the same assignee as this invention. When resonant chamber type acoustical treatment is used, the two materials for strips 21 and 23 can be tuned to resonate at different frequencies.

The effect of the axial strip acoustical treatment as shown in either FIG. 2 or FIG. 3 is to provide a large number of interruptions in the acoustical treatment as the spinning mode acoustic pressure fields sweep past the duct wall in the circumferential direction. There is an additional periodicity to which the sound field must conform, and a resulting enhanced scattering or multiple reflection of the sound fields to spinning modes of high, non-propagating lobe number. As compared to a fully-treated fan duct, the axial strip acoustical treatment is effective to alter the modal distribution of acoustic energy and increase the ratio or content of attenuating mode sound to propagating mode sound and thereby provide improved noise suppression. This can be explained both intutively and mathematically, and will be preceded by a review of the basic principles.

Figure 4A:
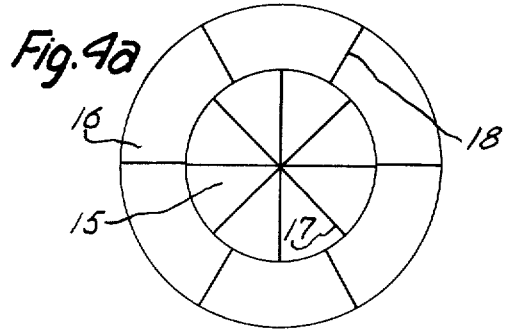
FIG. 4a is a diagrammatic representation of a stator and a rotor.
Figure 4B:
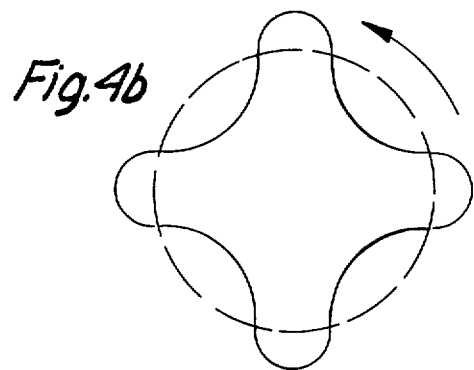
FIG. 4b is a sketch of a rotating lobed pressure pattern of the type generated by spinning mode sound fields.

As was previously mentioned, the rotor-stator interaction in a ducted axial flow compressor generates spinning, lobed acoustic pressure patterns which propagate through the duct in a spiral or helical path. Referring to the diagrammatic representation of a rotor and stator in FIG. 4a, it is realized that a pattern of pressure variations is established as the radial rotor blades 17 successively pass by the stationary stator vanes 18. A typical four-lobe rotating pressure pattern is illustrated in FIG. 4b, and other higher and lower order modes are also generated with a corresponding number of lobes in the pressure pattern. For a given acoustic frequency, the duct has a cut-off property in that sound will not propagate out of the inlet end of the duct unless the circumferential speed of the rotating acoustic pressure pattern as it sweeps past the duct wall exceeds the speed of sound. As the mode number or lobe number increases, the tip speed of the spinning lobe pattern decreases such that for higher lobe numbers the tip speed is below the speed of sound. Expressed mathematically, the dividing line between the propagating and attenuating modes is given by the equation $\omega a/m = c_o$, where $\omega$ is the circular frequency ($\omega = 2\pi f$), $a$ is the duct radius, $m$ is the mode number, $c_o$ is the speed of sound, and the product $\omega a$ is the tip speed. For higher order modes, where $m$ is a positive or negative interger, the term $\omega a/m$ has a value less than the speed of sound and these modes are attenuated. For further information on the above and other aspects of spinning mode noise, the reader is referred to the article "Axial Flow Compressor Noise Studies" by J. M. Tyler and T. G. Sofrin, SAE Transactions, Vol. 70, 1962, pp. 309–332.

FIG. 5a depicts graphically the modal distribution of sound pressure for spinning mode acoustical energy in a circular fully treated duct. The sound pressure level in decibels is plotted with respect to the mode number $m$, where the mode numbers are positive and negative integers shown in ascending order at either side of the zero mode at the center. The mode number, both positive and negative, at which cut-off occurs is defined by the expression $\omega a/c_o$, and mode numbers lower than the cut-off value are propagating modes while those higher than the cut-off value are the attentuating modes. The mode number at cut-off, it is appreciated, depends upon the parameters of the particular compressor being studied, and the mode number of approximately 5 at cut-off shown in FIG. 5a is typical. In this distribution pattern, generally speaking, the sound pressure is maximum at the zero mode, remains relatively high for the propagating modes, and decreases rapidly for the increasingly higher order attenuating modes.

FIG. 5b shows the altered modal distribution of sound pressure obtained in a circular duct with circumferentially segmented acoustical treatment employing S equally spaced axial strips, where S is the number of strips. The circumferentially segmented treatment is effective to enhance scattering of the sound fields to spinning modes of high, non-propagating lobe number. In this distribution pattern, there are auxiliary maxima for both the positive and negative modes, the sound pressure levels for the propagating modes are reduced as compared to the fully treated duct case, and the sound pressure levels for the higher order attenuating modes are increased as compared to the fully treated duct case. The auxiliary maxima are centered about the numbers S, 2S, −S, −2S, etc., and have a lower amplitude as compared to the zero mode maximum. With regard to the effect of the axial strip treatment to scatter or product multiple reflections of the rotating pressure patterns, an analogy in the field of optics is the light distribution pattern produced by a diffraction grating. In both cases there is an additional periodicity to which the incident energy must conform.

In mathematical terms, as will be readily understood by those familiar with the Tyler and Sofrin article, the pressure in each duct mode for the fully treated case will be of form $\exp [j(m\phi - \omega t)]$, where $m$ is any interger, $\phi$ is the angle around the circular duct, and $\omega = 2\pi f$, $f$ being the frequency of interest. By employing S axial strips having a spacing $2\pi a/S$ in the circumferential direction, the modes will have to satisfy a form $\exp [j(m \pm kS)\phi - \omega t]$, where $k$ is any non-negative integer. Thus, a modal pattern of the type illustrated in FIG. 5a for a fully treated duct is scattered to one of the type illustrated in FIG. 5b for a duct with S strips. As a comparison of FIG. 5a and 5b shows, the effect of scattering from mode numbers $m$ to those given by $(m \pm kS)$ serves to shift the pressure distribution from a predominantly propagating type to one with a higher content or proportion of non-propagating type modes. Another advantage is that even if shifts to non-propagating mode numbers do not occur (such as at high frequencies), shifting to high mode numbers enhances the effectiveness of treatment on the outer duct wall because in the case of high mode numbers or lobe numbers, the radial sound distributions tend to be peaked close to the outer wall. For the embodiment of FIG. 2, it is further observed that the amount of acoustical material required, and thus also the weight, is considerably reduced while yet obtaining effective noise reduction.

Experimental verification of the test sound suppression obtained by an acoustic duct with circumferentially segmented acoustical treatment as herein taught is given in FIGS. 6 and 7. FIG. 6 illustrates a representative directivity pattern for noise radiated from the inlet of a cylindrical duct 24 for the two cases when the duct is fully treated and is provided with axial strip treatment as shown in FIGS. 1 and 2. Measurements were made in an anechoic chamber using a one-third scale jet engine rotor with 44 rotor blades in a duct 24 with a diameter of 20 inches. The forward radiated noise at the blade passing frequency at 70 percent fan speed was measured along a horizontal arc extending from 0° to 100° with respect to the inlet axis. The acoustical material used for the fully treated case is the single degree of freedom, resonant chamber material, while for the axial treatment case 144 equally spaced strips, each ⅛ inch wide were used. These results show that while the axial strip treatment has little effect at the peak radiation angles, at several angles, including those beneath the jet engine, the axial strip treatment produces more effective noise reduction than the full treatment and some measurements were made giving as much as a 5dB reduction. At any angle, the axial strip treatment is at least as good as the full treatment. The axial strip treatment is also effective in situations where the fully treated inlet duct is noiser than the untreated inlet, perhaps due to a liner self noise problem. The results are generally applicable to different fan speeds and to different frequencies in the audio range.

FIG. 7 shows, for the experimental setup of FIG. 6, at a particular angle (60°) with respect to the inlet axis, the sound pressure levels over a wide range of sonic frequencies for a fully treated duct and a duct with axial strip treatment. These results show that the axial strip treatment is effective for suppressing broadband noise, such as is produced by a jet engine fan. In depicting the curves, common points within the range of experimental error are shown overlapping one another. Again, it can be stated that an improvement in noise reduction is often obtained, in particular at and near the blade passing frequency, and in any case is never noiser than the fully treated duct.

FIG. 8 shows a different type of cylindrical acoustic duct lined with longitudinally, or axially segmented sound-absorbing acoustical material. The axially segmented treatment, as compared to the circumferentially segmented treatment previously described, enhances the attenuation of noise by insuring repeated reflections and providing a periodic structure which functions to "filter" the sound. Either a single acoustical treatment can be used or two acoustical treatments with different acoustical impedances in alternating fashion as before. As illustrated, a cylindrical duct 26 such as is used for the reduction of appliance or machinery noise has attached to the inner surface thereof a set of axially spaced, circumferentially continuous strips or rings 27 of a suitable sound-absorbing material. By way of example, the circumferentially extending strips 27 can be made of a bulk or fibrous acoustic material selected to be effective at a chosen frequency. The axial spacing of the circumferential strip 27 is related to the wavelength of sound and is less than one wavelength. Typically, the strips 27 are spaced one-half wavelength apart. A second set of circumferential strips 28 can be provided for improved noise reduction, located between and alternating with the first set of strips 27 and having a different acoustical impedance as compared to the strips 27. As was mentioned, the periodically, axially interrupted acoustical treatment achieves noise suppression by the acoustic filtration mechanism.

According to another embodiment of the invention illustrated in FIGS. 9–11, both the peripherally or circumferentially segmented acoustic treatment and the longitudinally or axially segmented acoustic treatment, as heretofore discussed, can be combined for improved noise suppression. The developed view of such a combined treatment has a checkerboard appearance when the spacing of the orthogonally oriented strips is the same. The intersecting axial strips and circumferential strips are desirably made of the same acoustical material, and optionally can be combined with a second acoustical treatment having a different acoustical impedance which fills in the spaces between the intersecting strips. Thus, the cylindrical acoustic duct 26' has attached to its inner surface a screen-like pattern of intersecting axial strips 21' and circumferential strips 27'. Optionally, the spaces between the intersecting strips are filled with a set of four-sided lining members 29 made of an acoustic material having different acoustical properties. Various bulk or fibrous acoustic materials can be employed in the fabrication of this embodiment. Of course, a jet engine fan duct can be acoustically lined for enhanced noise suppression using the intersecting strip pattern treatment and can be made with resonant chamber type acoustical material.

It will be understood that although an acoustic duct with a circular cross section has been used in explaining the principles of the invention, that the invention in its broader aspect is applicable to acoustic ducts with a rectangular, square, or other cross section. Further, acoustic ducts for the reduction and absorption of spinning mode acoustic pressure fields as herein taught have many other applications than those specifically given.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. In a noise-suppressing duct having mounted therein rotating mechanical equipment with first stage rotor and stator blades which interact to generate spinning mode acoustic pressure fields with propagating and attenuating type modes, said duct being a rigid longitudinally extending duct with an acoustic lining attached to the inner surface thereof, the improvement in which said acoustic lining comprises
   a first set of peripherally spaced, longitudinally extending strips of sound-absorbing material, said first set of strips being relatively narrow in the peripheral direction and in total number at least exceeding the number of first stage rotor blades,
   a second set of peripherally spaced, longitudinally extending strips of sound-absorbing material mounted flush with said first set of strips and located between and alternating with said first set of strips,
   said first and second set of strips being made of sound-absorbing materials having different acoustical impedances and in combination forming a continuous acoustic lining,
   said first and second set of strips being effective to achieve scattering of said spinning mode acoustic pressure fields to increase the attenuating mode type content for improved noise suppression.

2. The combination according to claim 1 wherein individual strips of said first and second set of strips having approximately the same width.

3. In a noise-suppressing duct having mounted therein rotating mechanical equipment with first stage rotor and stator blades which interact to generate spinning mode acoustic pressure fields with propagating and attenuating type modes, said duct being a rigid longitudinally extending duct, the improvement which comprises
   a first set of peripherally spaced, longitudinally extending strips of a first sound-absorbing material attached to the inner surface of said duct, said first set of strips being relatively narrow in the peripheral direction and equally spaced and in total number at least exceeding the number of first stage rotor blades,
   a second set of at least several longitudinally spaced, peripherally extending strips of said first sound-absorbing material also attached to the inner surface of said duct and intersecting said first set of strips, said second set of strips being equally spaced in the longitudinal direction with a spacing less than one wavelength of sound at a selected frequency and further being mounted flush with said first set of strips,
   said first set of peripherally spaced strips being effective to achieve scattering of the spinning mode acoustic pressure fields for improved noise suppression.

4. The combination according to claim 3 further including a third set of lining members of a second sound-absorbing material attached to the inner surface of said duct between said first and second set of strips and flush therewith,
   said first and second sound-absorbing materials having different acoustical impedances.

5. In a noise-suppressing fan duct having an inlet duct and having mounted in said duct a compressor with first stage rotor and stator blades which interact to generate spinning mode acoustic pressure fields with propagating and attenuating type modes, said fan duct being a generally cylindrical rigid duct, wherein the improvement comprises
   a circumferentially segmented acoustical treatment attached to the inner surface of said inlet duct and including a first set of circumferentially spaced, axially extending strips of a first sound-absorbing material, said first set of strips being relatively narrow in the circumferential direction and in total number at least exceeding the number of first stage rotor blades,
   a second set of circumferentially spaced, axially extending strips of a second sound-absorbing material also attached to the inner surface of said inlet duct located between and alternating with said first set of strips so as to form a circumferentially continuous acoustic lining,
   said first and second sound-absorbing materials having different acoustical impedances and said first and second set of strips further being mounted flush with one another,
   said circumferentially segmented acoustical treatment being effective to achieve scattering of said spinning mode acoustic pressure fields to increase the attenuating type mode content for improved noise suppression.

6. The combination according to claim 5 wherein said circumferentially segmented acoustical treatment substantially covers the inner surface of said inlet duct.

7. The combination according to claim 5 wherein individual strips of said first and second set of strips have approximately the same width.

8. In a noise-suppressing fan duct having an inlet duct and having mounted in said duct a compressor with first stage rotor and stator blades which interact to generate spinning mode acoustic pressure fields with propagating and attenuating type modes, said fan duct being a generally cylindrical rigid duct, wherein the improvement comprises
   a circumferentially segmented acoustical treatment attached to the inner surface of said inlet duct and including a first set of circumferentially spaced, axially extending strips of a first sound-absorbing material, said first set of strips being relatively narrow in the circumferential direction and in total number at least exceeding the number of first stage rotor blades,
   an axially segmented acoustical treatment comprising a second set of at least several longitudinally spaced, peripherally extending strips of said first sound-absorbing material also attached to the inner surface of said inlet duct and intersecting said first set of strips, said second set of strips being equally spaced in the longitudinal direction with a spacing less than one wavelength of sound at a selected frequency and further being mounted flush with said first set of strips, said circumferentially segmented acoustical treatment being effective to achieve scattering of the spinning mode acoustic pressure fields for improved noise suppression.

9. The combination according to claim 8 further including a third set of lining members of a second sound-absorbing material attached to the inner surface of said inlet duct between said first and second set of strips and flush therewith, said first and second sound-absorbing materials having different acoustical impedances.

* * * * *